July 9, 1935.                   G. R. WOOD                    2,007,464
                              MEAT TENDERER
                           Filed April 20, 1933
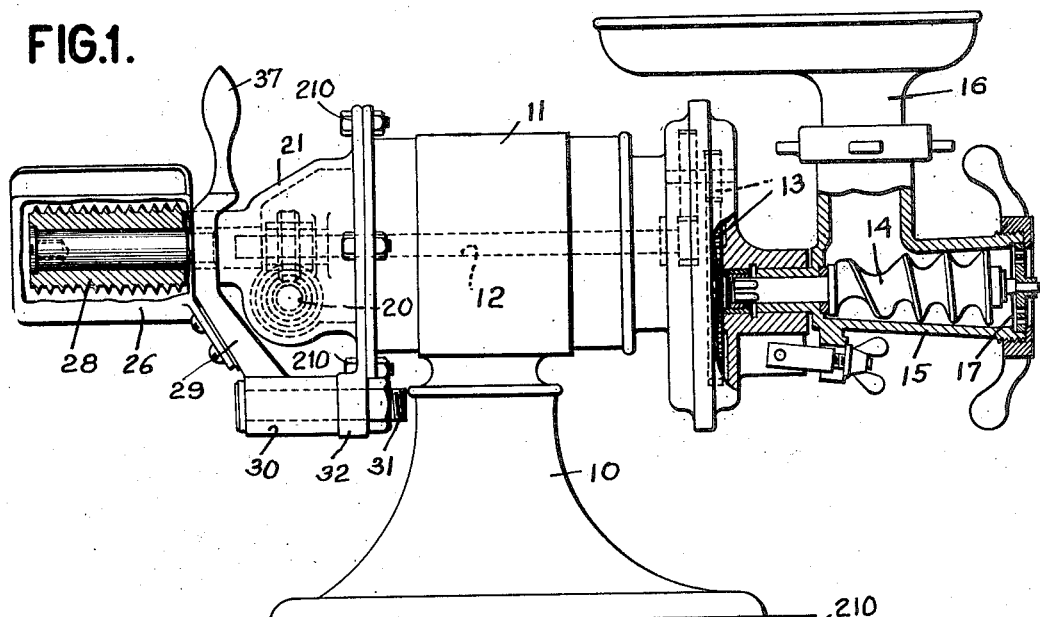
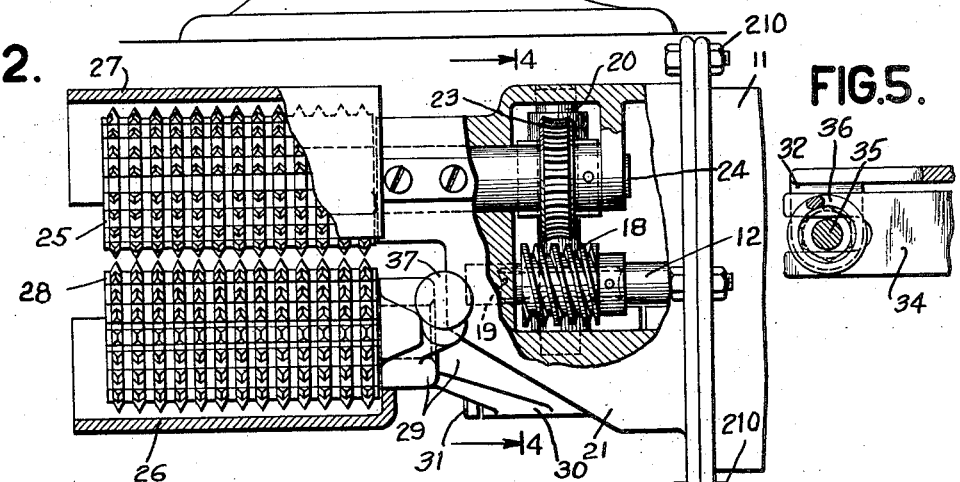
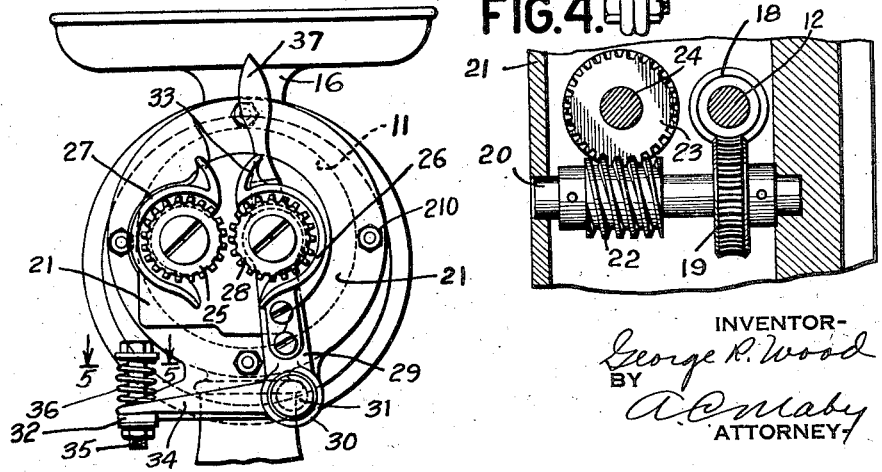
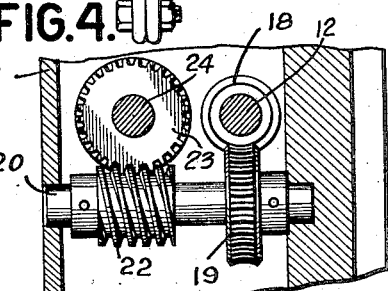
INVENTOR-
George R. Wood
BY
A. C. Maby
ATTORNEY Patented July 9, 1935

2,007,464

UNITED STATES PATENT OFFICE 2,007,464

MEAT-TENDERER

George R. Wood, Toronto, Ontario, Canada, assignor, by mesne assignments, to The Hobart Manufacturing Company, Troy, Ohio, a corporation of Ohio Application April 20, 1933, Serial No. 666,989

4 Claims. (Cl. 17—26)

This case relates to meat tenderers.

The object is to provide a meat tenderer peculiarly adapted for attachment to a meat chopper.

The object is further to provide a meat chopper and meat tenderer with a common motor drive.

Various other objects will appear from the description and the drawing, wherein

Fig. 1 is an elevation of the combined meat chopper and meat tenderer, partly in section;

Fig. 2 is a plan view of the meat tenderer and its driving means, partly in section;

Fig. 3 is an end view of the combined machine looking at it from the left hand side;

Fig. 4 is a section on line 4—4 of Fig. 2;

Fig. 5 is a section on line 5—5 of Fig. 3.

In detail, mounted on a base 10 is a motor and its housing 11, the shaft 12 of which is connected at its right hand end by speed reducing gearing 13 to the rear end of the feeding and cutting worm 14 of the meat chopper 15. Meat is fed through 16 to the worm 14 which cuts and feeds the meat to the extruding knife 17.

At its left hand end, motor shaft 12 has pinned thereto a worm 18 meshed with a gear 19 on a short shaft 20 journaled at opposite ends in the side walls of a gear housing 21 secured by bolts 210 to the left hand end of the motor housing. The shaft 20 carries at the side of gear 19, a worm 22 meshed with a gear 23. The latter is fast to shaft 24 journaled in housing 21 and which carries the sharp toothed tendering roller 25.

The gears 18, 19, 22, and 23 provide a reduction gearing between the high speed motor shaft and the tendering roller which must rotate at a comparatively low speed. The outer side of the periphery of roller 25 is housed and guarded by a member 27 fixed to the housing 21. The other tendering roller 28 is journaled in a generally vertical arm 29 of a bell crank lever 30 pivoted on bolt 31 carried by a depending extension 32 of the housing 21. The outer peripheral side of roller 28 is housed and guarded by a member 26 secured to the arm 29 and shaped similarly to the member 27. The upper ends of members 27 and 26 are flared to constitute a guide and entrance 33 for guiding the meat between the rollers 25 and 28. The horizontally disposed arm 34 of the bell crank lever 30 at its outer, free, end loosely surrounds a bolt 35 adjustably threaded into the extension 32. A coil spring 36 encircling the shank of bolt 35 acts on the free end of arm 34 to normally rock the bell crank lever 30 counterclockwise and force roller 28 toward roller 25.

The operator may withdraw roller 28 from roller 25 by grasping a handle portion 37 formed at the upper end of arm 29 and rocking bell lever 30 clockwise against resistance of spring 36.

The entire meat tenderer attachment comprising housing 21, extension 32, the gears 19, 22, 24, and their shafts, the rollers 25 and 28, their shields, and the other parts of the tenderer described above may be removed as a unit by unbolting the housing 21 from the motor housing.

In operation, the roller 28 being held separated from roller 25 by the operator, the meat is guided by the flared entrance 33 into the bite of the rollers, whereupon the operator releases handle 37, permitting the spring 36 to engage the rollers firmly with the meat. Roller 25 being rotated by the motor will cause the roller 28 to rotate likewise and the meat will therefore be cut and fed downwardly by the rollers.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a meat tenderer, a meat tendering roller, a frame for journaling the latter, a second tendering roller, a bell crank lever pivoted to said frame and having a generally vertical arm for journaling the second roller, and a generally horizontal arm disposed below both rollers, an extension on said frame, a bolt threaded into the extension and passing freely through the outer end of the horizontal arm, a coil spring encircling the bolt and bearing on the bolt surrounding portion of the horizontal arm to normally rock the bell crank lever in a direction to move the second roller towards the first-mentioned roller, and a handle formed on the upper end of the vertical arm adapted to be grasped by the operator to rock the bell crank lever and move the second roller away from the other roller against resistance of said spring.

2. In a meat tenderer, a meat tendering roller, a frame for journaling the latter, a second tendering roller, a bell crank lever pivoted to said frame and having a generally vertical arm for journaling the second roller, and a generally horizontal arm disposed below both rollers, an extension on said frame, a bolt threaded into the extension and passing freely through the outer end of the horizontal arm, a coil spring encircling the bolt and bearing on the bolt surrounding portion of the horizontal arm to normally rock the bell crank lever in a direction to move the second roller towards the first-mentioned roller, and a handle formed on the upper end of the vertical arm adapted to be grasped by the operator to rock the bell crank lever and move the second roller away from the other roller against resistance of said spring, a shield carried by the frame and embracing the outer side of the periphery of the first-named roller, a similar shield rigidly carried by the vertical arm and embracing the outer side of the periphery of the second roller, each of said shields having an integral extension extending upwardly and angularly to the shielding periphery of the shield, the extensions flaring away from each other and providing a guide and entrance for the meat as it is inserted into the bite of the rollers.

3. In a meat tenderer, a meat tendering roller, a frame for journaling the latter, a second tendering roller, a bell crank lever pivoted to said frame and having a generally vertical arm for journaling the second roller, and a generally horizontal arm disposed below both rollers, an extension on said frame, a bolt threaded into the extension and passing freely through the outer end of the horizontal arm, a coil spring encircling the bolt and bearing on the bolt surrounding portion of the horizontal arm to normally rock the bell crank lever in a direction to move the second roller towards the first-named roller, and a handle formed on the upper end of the vertical arm adapted to be grasped by the operator to rock the bell crank lever and move the second roller away from the other roller against resistance of said spring, the frame comprising a gear housing, gearing contained therein and connected to one of the rollers, a motor housing to which the gear housing is removably attached, a shaft for the motor, and driving connections from the motor shaft to said gearing.

4. In a meat tenderer, a pair of coacting tendering elements, one of said elements comprising a toothed roller, a frame, a bell crank lever pivoted to the frame and having two arms extending angularly to each other, one of said arms being provided intermediate its ends with means for journaling said roller and having rigid therewith and at its free end a handle, spring means engaged between the frame and the other arm of the lever for urging the lever to rock in a direction to move the roller towards the other tendering element, said lever being movable in the opposite direction by pressure exerted on said handle, and means for rotating said roller.

GEORGE R. WOOD.